(12) United States Patent
Pettey et al.

(10) Patent No.: US 8,845,993 B2
(45) Date of Patent: Sep. 30, 2014

(54) PURIFICATION OF BARIUM ION SOURCE

(75) Inventors: Lucas Pettey, Austin, TX (US); Richard D. Weir, Cedar Park, TX (US)

(73) Assignee: EEStor, Inc., Cedar Park, TX (US)

( * ) Notice: Subject to any disclaimer, the term of this patent is extended or adjusted under 35 U.S.C. 154(b) by 7 days.

(21) Appl. No.: 13/010,516

(22) Filed: Jan. 20, 2011

(65) Prior Publication Data

US 2011/0206595 A1   Aug. 25, 2011

Related U.S. Application Data

(60) Provisional application No. 61/296,881, filed on Jan. 20, 2010.

(51) Int. Cl.
  *C01F 11/48* (2006.01)
  *C01F 11/38* (2006.01)
(52) U.S. Cl.
  CPC ..................... *C01F 11/38* (2013.01)
  USPC ........................................................ 423/395
(58) Field of Classification Search
  USPC .................. 423/155, 157, 395, 399
  See application file for complete search history.

(56) References Cited

U.S. PATENT DOCUMENTS

| | | |
|---|---|---|
| 1,273,824 A | 7/1918 | Cobellis |
| 3,947,553 A | 3/1976 | Moss et al. |
| 4,008,309 A * | 2/1977 | Moldovan et al. .......... 423/157.2 |
| 4,053,572 A * | 10/1977 | Moss et al. .................... 423/490 |
| 4,054,598 A | 10/1977 | Blum et al. |
| 4,671,618 A | 6/1987 | Wu et al. |
| 4,733,328 A | 3/1988 | Blazej |
| 4,759,878 A | 7/1988 | Henrich et al. |
| 4,772,576 A | 9/1988 | Kimura et al. |
| 4,834,952 A | 5/1989 | Rollat et al. |
| 4,839,339 A | 6/1989 | Bunker et al. |
| 5,011,804 A | 4/1991 | Bergna et al. |
| 5,017,446 A | 5/1991 | Reichman et al. |
| 5,043,843 A | 8/1991 | Kimura et al. |
| 5,045,170 A | 9/1991 | Bullock et al. |
| 5,082,811 A | 1/1992 | Bruno |
| 5,087,437 A | 2/1992 | Bruno et al. |
| 5,116,560 A | 5/1992 | Dole et al. |
| 5,116,790 A | 5/1992 | Bruno et al. |
| 5,196,388 A | 3/1993 | Shyu |
| 5,242,674 A | 9/1993 | Bruno et al. |
| 5,252,311 A | 10/1993 | Riman et al. |
| 5,340,510 A | 8/1994 | Bowen |
| 5,362,472 A | 11/1994 | Lauter et al. |
| 5,407,618 A | 4/1995 | Stephenson |
| 5,417,956 A | 5/1995 | Moser |
| 5,711,988 A | 1/1998 | Tsai et al. |
| 5,730,874 A | 3/1998 | Wai et al. |
| 5,731,948 A | 3/1998 | Yializis et al. |
| 5,738,919 A | 4/1998 | Thomas et al. |
| 5,744,258 A | 4/1998 | Bai et al. |
| 5,776,239 A | 7/1998 | Bruno |
| 5,797,971 A | 8/1998 | Zheng et al. |
| 5,800,857 A | 9/1998 | Ahmad et al. |
| 5,833,905 A | 11/1998 | Miki |
| 5,850,113 A | 12/1998 | Weimer et al. |
| 5,867,363 A | 2/1999 | Tsai et al. |
| 5,900,223 A | 5/1999 | Matijevic et al. |
| 5,929,259 A | 7/1999 | Lockemeyer |
| 5,973,175 A | 10/1999 | Bruno |
| 5,973,913 A | 10/1999 | McEwen et al. |
| 6,005,764 A | 12/1999 | Anderson et al. |
| 6,072,688 A | 6/2000 | Hennings et al. |
| 6,078,494 A | 6/2000 | Hansen |
| 6,195,249 B1 | 2/2001 | Honda et al. |
| 6,228,161 B1 | 5/2001 | Drummond |
| 6,243,254 B1 | 6/2001 | Wada et al. |
| 6,268,054 B1 | 7/2001 | Costantino et al. |
| 6,294,620 B1 | 9/2001 | Huang et al. |
| 6,296,716 B1 | 10/2001 | Haerle et al. |
| 6,331,929 B1 | 12/2001 | Masuda et al. |
| 6,352,681 B1 | 3/2002 | Horikawa et al. |
| 6,410,157 B1 | 6/2002 | Nakamura |
| 6,447,910 B1 | 9/2002 | Wataya |
| 6,485,591 B1 | 11/2002 | Nakao |
| 6,501,639 B2 | 12/2002 | Takafuji |
| 6,550,117 B1 | 4/2003 | Tokuoka |
| 6,660,186 B2 * | 12/2003 | Ravilisetty ............. 252/301.4 R |
| 6,673,274 B2 | 1/2004 | Venigalla et al. |
| 6,692,721 B2 | 2/2004 | Hur et al. |
| 6,703,719 B1 | 3/2004 | McConnell |

(Continued)

FOREIGN PATENT DOCUMENTS

| | | |
|---|---|---|
| CA | 02598787 | 3/2008 |
| CA | 02598754 | 4/2008 |

(Continued)

OTHER PUBLICATIONS

Willard et al, "Separation fo Strontium, Barium, and Lead from Calcium and Other Metals," 1936, Industrial and Engineering Chemistry, vol. 8, No. 6, pp. 414-418.*

(Continued)

*Primary Examiner* — Stanley Silverman
*Assistant Examiner* — Justin Bova
(74) *Attorney, Agent, or Firm* — Abel Law Group, LLP

(57) ABSTRACT

A method of preparing purified barium nitrate includes precipitating barium nitrate crystals from a solution, and washing the barium nitrate crystals with an aqueous solution including at least 10 wt % nitric acid.

10 Claims, No Drawings

(56) References Cited

U.S. PATENT DOCUMENTS

| | | | |
|---|---|---|---|
| 6,715,197 | B2 | 4/2004 | Okuyama |
| 6,749,898 | B2 | 6/2004 | Nakamura |
| 6,905,989 | B2 | 6/2005 | Ellis et al. |
| 7,033,406 | B2 | 4/2006 | Weir et al. |
| 7,061,139 | B2 | 6/2006 | Young |
| 7,068,898 | B2 | 6/2006 | Buretea et al. |
| 7,228,050 | B1 | 6/2007 | Buretea et al. |
| 7,237,634 | B2 | 7/2007 | Severinsky et al. |
| 7,466,536 | B1 | 12/2008 | Weir et al. |
| 7,648,687 | B1 | 1/2010 | Weir et al. |
| 7,729,811 | B1 | 6/2010 | Weir et al. |
| 7,914,755 | B2 | 3/2011 | Weir et al. |
| 7,993,611 | B2 | 8/2011 | Weir et al. |
| 2001/0010367 | A1 | 8/2001 | Burnell-Jones |
| 2002/0186522 | A1 | 12/2002 | Honda et al. |
| 2003/0052658 | A1 | 3/2003 | Baretich |
| 2004/0135436 | A1 | 7/2004 | Gilbreth |
| 2006/0210779 | A1 | 9/2006 | Weir et al. |
| 2007/0148065 | A1 | 6/2007 | Weir et al. |
| 2008/0016681 | A1 | 1/2008 | Eisenring |
| 2010/0267546 | A1 | 10/2010 | Weir et al. |
| 2010/0285316 | A1 | 11/2010 | Weir et al. |
| 2010/0285947 | A1 | 11/2010 | Weir et al. |
| 2011/0053758 | A1 | 3/2011 | Weir et al. |
| 2011/0152060 | A1 | 6/2011 | Weir et al. |
| 2011/0170232 | A1 | 7/2011 | Weir et al. |

FOREIGN PATENT DOCUMENTS

| | | | | |
|---|---|---|---|---|
| CN | 1451607 | A | | 10/2003 |
| EP | 1020487 | A1 | | 7/2000 |
| GB | 230045 | | * | 7/1925 ............... C01D 9/04 |
| JP | 55154321 | | | 12/1980 |
| JP | 63248719 | A | | 10/1988 |
| JP | 01179721 | A | | 7/1989 |
| JP | 05017150 | A | | 1/1993 |
| JP | 07291607 | A | | 11/1995 |
| JP | 10-167730 | A | | 6/1998 |
| JP | 11147716 | | | 6/1999 |
| JP | 2003192343 | | * | 7/2003 |
| SU | 472904 | | * | 10/1975 |
| SU | 674987 | A | | 7/1979 |
| WO | 9316012 | | | 8/1993 |
| WO | 2008031189 | A1 | | 3/2008 |
| WO | 2008040114 | A1 | | 4/2008 |
| WO | 2012134424 | A2 | | 10/2012 |

OTHER PUBLICATIONS

F. Sears et al., "Capacitance—Properties of Dielectrics", University of Physics, Addison Wesley Publishing Company, Inc., Feb. 1984, pp. 516-533.

J. Kuwata et al., "Electrical Properties of Perovskite-Type Oxide Thin-Films Prepared by RF Sputtering", Jpn J. Appl. Phys., Part 1, 1985, 413-15.

Bruno et al., "High-Performance Multilayer Capacitor Dielectrics from Chemically Prepared Powders", Journal of the American Ceramic Society, vol. 76, No. 5, pp. 1233-1241, 1993.

Mitsubishi Polyester Film Corporation specification sheet for Hostaphan (R) RE film for capacitors, Copyright 2007.

Beheir et al., "Studies on the liquid-liquid extraction and ion and precipitate flotation of Co(II) with decanoic acid", Journal of Radioanalytical and Nuclear Chemistry, Articles, vol. 174m,No. 1 (1992) 13-22.

Wikipedia.org; the free encyclopedia; "ammonium hydroxide", last modified Aug. 16, 2008; 1 page.

International Search Report for PCT/US2011/021887 dated Oct. 31, 2012, 2 pgs.

Jackwerth, et al. "AAS multielement analysis of strontium and barium salts after preconcentration by precipitation of the matrix as nitrates", Spectrochimica Acta. Part B: Atomic Spectroscopy, New York, NY, US, vol. 33, No. 7, Jan. 1, 1978, pp. 343-348.

Zhang Yuejun et al., "Production and Application of Electronic Chemicals", Jiangsu Science and Technology Publishing House, p. 282-286, Jul. 31, 2005. No English Abstract. Translation of relevant paragraphs attached.

Han Changri et al., "Manufacture Technology for Inorganic Fine Chemicals", Science and Technology Document Press, p. 250-253, Aug. 31, 2008. No English Abstract. Translation of relevant paragraphs attached.

* cited by examiner

PURIFICATION OF BARIUM ION SOURCE

CROSS-REFERENCE TO RELATED APPLICATION(S)

The present application claims priority from U.S. Provisional Patent Application No. 61/296,881, filed Jan. 20, 2010, entitled "PURIFICATION OF BARIUM ION SOURCE," naming inventors Lucas Pettey and Richard D. Weir, which application is incorporated by reference herein in its entirety.

FIELD OF THE DISCLOSURE

This disclosure, in general, relates to methods of preparing purified nitrate salts and in particular, relates to methods of preparing barium nitrate.

BACKGROUND

In the wet-chemical co-precipitation procedure for the preparation of composition-modified barium titanate powder, it is desirable to remove impurities from the starting materials that are deleterious to the performance of the end product. An example is the barium nitrate $[Ba(NO_3)_2]$ precursor in which sodium ($Na^+$), potassium ($K^+$), and strontium ($Sr^{2+}$) ions are particularly undesirable impurities, the first two being mobile ions under an applied electric field, and the third suppressing the relative permittivity.

DESCRIPTION OF THE PREFERRED EMBODIMENT(S)

In a particular embodiment, a nitrate salt, such as barium nitrate, is prepared by precipitating the nitrate salt from a solution including a metal ion, such as a barium ion, by adding a nitrate ion source, such as nitric acid. The nitrate salt is separated and washed with a nitric acid solution. In an example, the nitric acid solution includes at least 5 wt % nitric acid, such as at least 10 wt % nitric acid. In another example, the nitric acid solution has a temperature of not greater than 50° C., such as not greater than 30° C.

In an example, barium nitrate prepared in such a manner has desirable purity and can be used in the preparation of sufficiently pure composition-modified barium titanate powders. Such composition-modified barium titanate powders can be used to form dielectric materials, for example, useful in capacitive structures, such as energy storage units. In particular, the present purification process for barium nitrate significantly reduces the concentration of both sodium ($Na^+$) and potassium ($K^+$) ions from these crystals.

In an embodiment, a method of preparing barium nitrate includes precipitating barium nitrate crystals and washing the crystals. The method can also include preparing a primary solution from which the barium nitrate crystals are precipitated, such as by dissolving a barium source, for example, barium carbonate. Alternatively, a commercially available barium solution can be used, such as a reagent grade barium solution.

Precipitating the barium nitrate crystals or particles includes precipitating the barium nitrate crystals from a primary solution including barium ions. A nitrate source, such as a nitric acid solution, can be added to the primary solution to form a combined solution from which the barium nitrate crystals precipitate. In an example, the nitric acid solution is an aqueous solution that includes at least 40 wt % nitric acid, such as at least 50 wt % nitric acid, at least 60 wt % nitric acid, or even at least 70 wt % nitric acid. The nitrate source can be used in an amount sufficient to provide in the combined solution with at least 10 wt % nitric acid, such as at least 15 wt % nitric acid, or even at least 20 wt % nitric acid. In a particular example, the amount of nitric acid in the combined solution can be in a range of 10 wt % to 30 wt %. Precipitation can be performed at a temperature in a range of 10° C. to 50° C., such as a range of 15° C. to 35° C., or a range of 20° C. to 30° C.

During precipitation, the primary or combined solution can be agitated. For example, the combined solution can be agitated by stirring, shaking, or through sonic agitation. In particular, the combined solution can be agitated using sonic agitation, such as ultrasonic agitation.

The barium nitrate crystals can be separated from at least a portion of the combined solution. For example, the crystals can be separated by decanting, filtering, centrifuging, or a combination thereof. In particular, the crystals can be permitted to settle and a portion of the combined solution decanted from the crystals. In another example, the crystals can be filtered using a filter medium. In a further example, the crystals can be separated from a portion of the combined solution using a centrifuge. The centrifuge can be a batch centrifuge or can be a continuous centrifuge, such as a cyclonic centrifuge.

In addition, the barium nitrate crystals can be washed using a wash solution, such as an aqueous solution. Washing can be performed after separation or can be performed in combination with separating. In particular, the wash solution includes a nitrate source, such as nitric acid. For example, the wash solution can include at least 5 wt % nitric acid, such as at least 10 wt % nitric acid, at least 15 wt % nitric acid, or even at least 20 wt % nitric acid. In a further example, the wash solution includes nitric acid in a range of 15 wt % to 35 wt %, such as a range of 15 wt % to 25 wt %.

Washing can be performed with a wash solution having a relative cool temperature. For example, the wash solution can have a temperature not greater than 50° C., such as not greater than 35° C., not greater than 30° C., not greater than 28° C., not greater than 25° C., or even not greater than 20° C. In a further example, the wash solution can have a temperature in a range of 4° C. to 30° C., such as a range of 10° C. to 30° C.

Following washing, the barium nitrate crystals can be dissolved to form a purified barium source solution. Such a source solution can be used as a source of barium ions for precipitating barium containing ceramic components. In a particular example, the barium source solution can be used in a precipitation reaction with sources of titanium and other components to form composition-modified barium titanate. Alternatively, the barium nitrate crystals can be dried for use.

In a further example, the purified barium source solution can be used as the primary solution and the process described above repeated to further purify the barium source. Performing the above process once is referred to as a single pass. Performing the process more than once can be referred to, for example, as a double pass, triple pass, or quadruple pass, depending on the number of times the process is repeated.

In a particular example, the single pass yield of the barium ions, defined as the yield of barium ions after performing the process once, is at least 80%. For example, the single pass yield of the barium ions can be at least 85%, such as at least 90%, at least 92%, at least 94%, or higher.

In a further example, the single pass separation coefficient for impurities, defined as the ratio of impurity concentration (ppm) in the barium source to the impurity concentration in the resulting crystals, is high. The separation coefficient can also be measured based on the primary solution as long as the resulting crystals are redissolved to form a test solution having the same concentration of barium ions. In particular, the single pass separation coefficient for strontium is at least 1000, such as at least 2000, at least 4000, or even at least 8000. The single pass separation coefficient for calcium can be at least 100, such as at least 200, or even at least 450. The single pass separation coefficient for sodium can be at least 50, such as at least 100, or even at least 200. In a further example, the single pass separation coefficient for potassium can be at least 20, such as at least 50, or even at least 90.

While the barium and nitric acid are described above as exemplary components, other cations and nitrate sources can be used. In particular, the method can include adding a nitrate ion source to a primary solution including a cation to precipitate cation nitrate crystals. The method can further include separating the crystals and washing the crystals with a wash solution. The wash solution includes at least 10 wt % of a nitrate ion source and has a temperature not greater than 30° C.

In a particular example, a primary solution including a cation, such as a barium ion, is prepared. For example, the starting barium compound can be barium carbonate ($BaCO_3$). In an example, the barium carbonate can be dissolved using an aqueous acid solution, such as an aqueous solution including nitric acid.

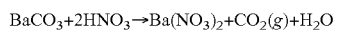

$$BaCO_3 + 2HNO_3 \rightarrow Ba(NO_3)_2 + CO_2(g) + H_2O$$

In particular, one mole of $BaCO_3$ (FW 197.3359 g/mol) and two moles of $HNO_3$ [(FW 63.01284 g/mol) corresponding to (128.5976 mL at 25° C. of 70 wt % 15.5524 M $HNO_3$) with density at 25° C. of 1.400 g/mL] results in one mole of $Ba(NO_3)_2$ (FW 261.3368 g/mol).

To a saturated solution at room temperate of barium nitrate in deionized water with ultrasonic agitation, 70 wt % (15.5524 M) nitric acid is added in sufficient amount to result in, for example, a 20 wt % (4.435 M) nitric acid aqueous solution. Since the solubility of barium nitrate in this combination solution has been exceeded, barium nitrate crystallizes out of solution. The crystals are separated by filtration, decanting, or centrifuging of the mother liquid, and then are washed with chilled 20 wt % (4.435 M) nitric acid. In this way there is minimal loss in the amount of crystalline $Ba(NO_3)_2$ instead of the substantial loss as would be the case for washing with deionized water. Washing with higher concentrations of nitric acid can also be employed.

The dewatering step with chilled nitric acid results in the required purification with minimal loss of $Ba(NO_3)_2$. Another feature of this purification procedure is that it can be repeated until the desired degree of purity is reached.

The solubility of $Ba(NO_3)_2$ at 25° C. is 9.858 g/100 mL of soln. or 0.377 mol/L of soln. To dissolve one mole of $Ba(NO_3)_2$ [FW 261.3368 g/mol], 2.899 L of DI water is used. The solubility of $Ba(NO_3)_2$ in 20 wt % $HNO_3$ (4.435 M) is 0.366 g/100 mL or 0.018 mol/L of soln. Thus the solubility difference is 24.645 times.

Example 1

A nearly saturated solution of barium nitrate is obtained and assayed for barium, calcium, potassium, sodium and strontium. Metal content is determined using inductive-coupled-plasma spectroscopy. Using a graduated cylinder, 2.899 L of the solution is transferred to an ultrasonic tank. The ultrasound is activated and 878 mL of Cleanroom LP grade 70% nitric acid is added to the tank. Crystals immediately form.

The system is left under ultrasonic agitation for five minutes. After the ultrasound is turned off, the crystals are allowed to settle for five minutes. The solution is decanted by pumping off 3.4 L, leaving approximately 10% of the volume behind. A peristaltic pump is used to decant the solution and the suction line is maintained just below the liquid level in the tank to minimize crystal loss. The decanted liquid is assayed for metal content.

The crystals are then washed twice with 20% nitric acid, which has previously been refrigerated to 10° C. according to the following procedure. First, the ultrasound is activated. Next, 1 L of high purity 20% nitric acid, derived from the Cleanroom LP grade nitric acid, is added to the tank. The system remains under ultrasonic agitation for five minutes. After deactivating the ultrasound, the liquid is decanted with the peristaltic pump until approximately 10% remained. After the first wash, 818 mL are removed and after the second wash, 1.1 L is removed.

The decanted liquid is assayed for metal content. The concentration data is summarized in Table 1 below. Using the volume removed during each decant, the percent removal is calculated in the last row by comparing the milligrams initially present with the milligrams removed during the purification.

TABLE 1

Concentration of Metal Ions

| Solution | ppm Ba | ppm Ca | ppm K | ppm Na | ppm Sr |
|---|---|---|---|---|---|
| Stock | 46483 | 38.5 | 0.4939 | 30.74 | 776 |
| Initial decant | 3397 | 35.2 | 0.3192 | 15.65 | 467 |
| Wash 1 | 2508 | 8.03 | 0.1990 | 4.99 | 183 |
| Wash 2 | 1814 | 3.91 | 0.1857 | 3.25 | 95.5 |
| % removed | 8.88 | 89.7 | 77.9 | 52.4 | 62.8 |

Further repetitions of the process described above continue to decrease the concentrations of calcium, sodium and strontium while the concentration of potassium remained constant. The potassium concentrations are near the specifications for Cleanroom LP nitric acid. Further purification appears limited by the purity of the nitric acid source.

Example 2

With an Optima grade nitric acid, concentrations of contaminants are lower, generally in a range of parts per trillion. Optima grade nitric acid reports ultra-low impurity concentrations. For example, the concentration of calcium is less than 20 ppt, typically less than 10 ppt; the concentration of potassium is less than 10 ppt, typically less than 5 ppt; the concentration of sodium is less than 10 ppt, typically less than 5 ppt; and the concentration of strontium is less than 10 ppt, typically less than 1 ppt.

To purify a saturated solution of $Ba(NO_3)_2$ that contains one mole of $Ba(NO_3)_2$ (total volume is 2.899 L):

Add 878 mL of Optima Grade 70 wt % $HNO_3$, providing 20 wt % $HNO_3$ is solution, and as a result, the solution includes 16.048 moles of $(NO_3)^-$ and one mole of Ba in the solution, exceeding the solubility limit of $Ba(NO_3)_2$. An amount of 0.9560 moles of $Ba(NO_3)_2$ crystallizes. Under ultrasonic agitation, particle size is limited and very few contaminant ions become trapped in the $Ba(NO_3)_2$ crystals. The solution is dewatered to 5% to 10% of its volume (0.378 L) by decanting. The mother liquid contains the contaminants and a small amount of $Ba(NO_3)_2$.

The remaining slurry is washed with 1 L of 20 wt % $HNO_3$ derived from Optima Grade nitric acid. An amount of 0.013 moles of $Ba(NO_3)_2$ dissolves, but undesired ions that remain in the solution continue to wash away. The washing procedure can be repeated until the desired purity is achieved. Each time the Ba(NO$_3$)$_2$ crystals are washed with 1 L of 20 wt % HNO$_3$ in the manner described above, approximately 0.013 moles of Ba(NO$_3$)$_2$ dissolves in the wash. If deionized water is used rather than 20 wt % HNO$_3$, approximately 0.105 moles of the Ba(NO$_3$)$_2$ crystals dissolves.

In particular, a single-step recrystallization procedure is noteworthy because of its low cost, very high yield of crystalline product, very high separation coefficient resulting in a highly pure crystalline product, relative ease of implementation with conventional lab ware, and very high efficiency. Table 2 illustrates the concentration of impurities in the resulting washed crystals.

TABLE 2

Concentration of Ions.

| Solution | ppm Ba | ppm Ca | ppm K | ppm Na | ppm Sr |
|---|---|---|---|---|---|
| Stock | 46483 | 38.5 | 0.4939 | 30.74 | 776 |
| Initial decant | 3397 | 35.2 | 0.3192 | 15.65 | 467 |
| First Wash | 2508 | <0.1 | <0.1 | <0.8 | <1 |
| Additional Wash | 1814 | <0.05 | <0.05 | <0.05 | <0.1 |

For the analysis indicated in Table 2, of the Ba(NO$_3$)$_2$ solution sample, the elements Na$^+$, K$^+$, Ca$^{++}$, and Sr$^{++}$ are less than 1.0 ppm, with K$^+$ and Ca$^{++}$ being below 100 ppb. With additional washing, the concentrations can be below 50 ppb for each of Na$^+$, K$^+$, and Ca$^{++}$. In addition, most other impurity elements are also in concentrations under 1.0 ppm and likely less than 100 ppb.

While specific embodiments of the process are described above, this procedure may be applicable to the purification of other nitrate compounds. Since nitrates are water-soluble, the above described method becomes a low-cost method for purification of other metal elements, depending on the nature of the metal element and the nature of the impurities.

Comparative Example 1

In conventional recrystallization by water evaporation from a saturated aqueous solution, for each recrystallization, the part remaining in solution (the mother liquid), now enriched in the impurities from that of the solution prior to the evaporation, is salvageable for applications where these impurities are not undesirable.

An example of a stepwise procedure where a 50 percent yield for each successive step is selected follows:
1) Begin with a saturated solution of barium nitrate by dissolving 103 g of Ba(NO$_3$)$_2$ in 1 kg of deionized water;
2) Heat the liquid to near boiling temperatures until the volume of the solution decreases to 500 mL. Crystals of Ba(NO$_3$)$_2$ form as the water is removed from the solution;
3) Filter the hot solution to separate the purified crystals from the remaining mother liquid;
4) Dissolve the purified crystals in 500 mL of deionized water to create a new saturated solution of Ba(NO$_3$)$_2$; and
5) Repeat steps 2-4 until the desired purity is achieved.

With a single recrystallization, about 50 percent of the barium nitrate is impurity enriched. With two recrystallizations, about 75 percent is impurity enriched, with three recrystallizations 87.5 percent impurity enriched, leaving only 12.5 percent purity enhanced and so on. As such, the yield of high purity barium nitrate is not greater than 12.5%.

Comparative Example 2

Crystallization purification of Ba(NO$_3$)$_2$ from a 10 to 20 wt % HNO$_3$ aqueous solution is more efficient than the conventional water evaporation from the saturated Ba(NO$_3$)$_2$ aqueous solution because the impurity segregation coefficient is much larger for the former. As with all fractional crystallization processes, the principle of diminishing returns is operative. The separation coefficient decreases with the increasing purity of the crystals. For example, the separation coefficient is as high as 500 for impure materials and as low as 5 for highly purified material. The low value of 5 is still practical, however, the yield is low. Concentrations of approximately 5 ppm for calcium and strontium ions have been achieved; for those of sodium and potassium approximately 6 ppm with a segregation coefficient of 10 are obtained.

In a first embodiment, a method of preparing purified barium nitrate includes adding a nitric acid solution to an aqueous solution including barium ions to precipitate barium nitrate crystals. The nitric acid solution is added in sufficient amount to provide a combined solution having at least 10 wt % nitric acid. The method also includes agitating the combined solution during precipitation of the barium nitrate crystals, separating the barium nitrate crystals, and washing the barium nitrate crystals with a wash solution including at least 15 wt % nitric acid and having a temperature of not greater than 30° C. The single pass yield of barium ions is at least 80%. The single pass separation coefficient for strontium is at least 2000.

In an example of the first embodiment, the aqueous solution includes at least 20 wt % nitric acid. For example, the aqueous solution includes nitric acid in a range of 15 wt % to 35 wt %.

In another example of the first embodiment, the temperature is not greater than 28° C., such as not greater than 25° C. For example, the temperature is in a range of 4° C. to 30° C., such as a range of 10° C. to 30° C.

In a further example of the first embodiment, separating includes filtering. In an additional example, separating includes decanting. In another example, separating includes centrifuging.

In an additional example of the first embodiment, agitating includes ultrasonic agitating.

In another example of the first embodiment, precipitating includes adding a nitric acid solution including at least 40 wt % nitric acid. For example, the nitric acid solution includes at least 50 wt % nitric acid, such as at least 60 wt % nitric acid or at least 70 wt % nitric acid.

In a further example of the first embodiment, the method further includes dissolving the washed barium nitrate crystals. In another example, the method further includes repeating precipitating and washing following dissolving.

In an additional example of the first embodiment, the single pass yield of barium ions is at least 85%, such as at least 90%, at least 92%, or even at least 94%. In a particular example, the single pass separation coefficient for strontium is at least 1000, such as at least 2000, at least 4000, or even at least 8000.

In another example of the first embodiment, the single pass separation coefficient for calcium is at least 200, such as at least 450. In a further example, the single pass separation coefficient for sodium is at least 100, such as at least 200. In an additional example, the single pass separation coefficient for potassium is at least 50, such as at least 90.

In a second embodiment, a method of preparing purified barium nitrate includes mixing a nitric acid solution with a solution including barium ions to precipitate barium nitrate crystals, separating the barium nitrate crystals, and washing the barium nitrate crystals with a wash solution including at least 10 wt % nitric acid and having a temperature not greater than 50° C.

In a third embodiment, a method of preparing purified barium nitrate includes adding a nitric acid solution to an aqueous solution including barium ions to precipitate barium nitrate crystals. The nitric acid solution is added in sufficient amount to provide a combined solution having at least 10 wt % nitric acid. The method further includes agitating the combined solution during precipitation of the barium nitrate crystals, separating the barium nitrate crystals, and washing the barium nitrate crystals with a wash solution including at least 15 wt % nitric acid and having a temperature of not greater than 30° C.

In a fourth embodiment, a method of preparing purified barium nitrate includes precipitating barium nitrate crystals from a solution and washing the barium nitrate crystals with an aqueous solution including at least 10 wt % nitric acid.

In an example of the fourth embodiment, the aqueous solution includes at least 15 wt % nitric acid, such as at least 20 wt % nitric acid. For example, the aqueous solution includes nitric acid in a range of 15 wt % to 35 wt %.

In another example of the fourth embodiment, the aqueous solution has a temperature of not greater than 50° C. For example, the temperature is not greater than 35° C., such as not greater than 30° C., not greater than 28° C., or even not greater than 25° C. In an additional example, the temperature is in a range of 4° C. to 30° C., such as a range of 10° C. to 30° C.

In a further example of the fourth embodiment, the method further includes separating the precipitated barium nitrate crystals from the solution. For example, separating includes filtering. In an additional example, separating includes decanting. In another example, separating includes centrifuging.

In an additional example of the fourth embodiment, the method further includes agitating the solution while precipitating. In another example of the fourth embodiment, agitating includes ultrasonic agitating.

In a further example of the fourth embodiment, precipitating includes adding a nitric acid solution including at least 40 wt % nitric acid, such as at least 50 wt % nitric acid, at least 60 wt % nitric acid, or even at least 70 wt % nitric acid.

In another example of the fourth embodiment, the nitric acid solution is added in an amount sufficient to provide a combined solution including at least 10 wt % nitric acid, such as at least 15 wt % nitric acid or even at least 20 wt % nitric acid. In a particular example, the amount is sufficient to provide a combined solution including nitric acid in a range of 10 wt % to 30 wt %.

In an additional example of the fourth embodiment, the method further includes dissolving the washed barium nitrate crystals. In another example, the method further includes repeating precipitating and washing following dissolving.

In a further example of the fourth embodiment, the single pass yield of barium ions is at least 80%, such as at least 85%, at least 90%, at least 92% or even at least 94%. In another example, the single pass separation coefficient for strontium is at least 1000, such as at least 2000, at least 4000, or even at least 8000. In an additional example, the single pass separation coefficient for calcium is at least 200, such as at least 450. In a further example, the single pass separation coefficient for sodium is at least 100, such as at least 200. In an additional example, the single pass separation coefficient for potassium is at least 50, such as at least 90.

In a fifth embodiment, a method of preparing purified metal nitrate includes adding a nitrate ion source to a primary solution including a cation to precipitate cation nitrate crystals, separating the cation nitrate crystals from the primary solution, and washing the cation nitrate crystals with a wash solution including at least 10 wt % nitric acid and having a temperature of not greater than 30° C.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of preparing purified barium nitrate, the method comprising:
    adding a nitric acid solution to an aqueous solution including barium ions to precipitate barium nitrate crystals, wherein the nitric acid solution is added in sufficient amount to provide a combined solution having at least 20 wt % nitric acid;
    agitating the combined solution during precipitation of the barium nitrate crystals;
    separating the barium nitrate crystals; and
    washing the barium nitrate crystals with a wash solution including nitric acid in a range of 15 wt % to 35 wt % and having a temperature of not greater than 30° C.;
    wherein a single pass yield of barium ions is at least 80%;

wherein a single pass separation coefficient for strontium is at least 2000; and wherein the method does not include washing the barium nitrate crystals with only deionized water.

2. The method of claim 1, wherein agitating includes ultrasonic agitating.

3. The method of claim 1, wherein the nitric acid solution added to the aqueous solution includes at least 40 wt % nitric acid.

4. The method of claim 1, wherein a single pass separation coefficient for calcium is at least 200.

5. The method of claim 1, wherein a single pass separation coefficient for sodium is at least 100.

6. The method of claim 1, wherein a single pass separation coefficient for potassium is at least 50.

7. The method of claim 1, wherein the single pass yield of barium ions is at least 85%.

8. The method of claim 1, wherein the single pass yield of barium ions is at least 90%.

9. The method of claim 1, wherein the single pass yield of barium ions is at least 92%.

10. The method of claim 1, wherein the single pass yield of barium ions is at least 94%.

* * * * *